Patented Sept. 1, 1953

2,650,923

UNITED STATES PATENT OFFICE 2,650,923

1 - ALKENYL - 5 - ALKYL - 6 - AMINO - 1,2,3,4-TETRAHYDRO - 2,4 - PYRIMIDINEDIONES AND DERIVATIVES THEREOF

Viktor Papesch, Morton Grove, Ill., assignor to G. D. Searle & Co., Chicago, Ill., a corporation of Illinois No Drawing. Application May 23, 1952,
Serial No. 289,663

12 Claims. (Cl. 260—256.4)

The present invention is concerned with a new group of heterocyclic compounds and, particularly, with the pyrimidine derivatives of the structural formula

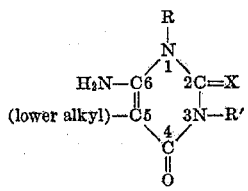

wherein X is a nonmetallic element of periodic group VI, and one of the radicals R and R' is an alkenyl radical and the other is a member of the group consisting of aryl, aralkyl and alkenyl radicals. In addition the radical R' can also be a hydrogen atom.

In the foregoing structural formula the radical X can be either oxygen or sulfur. One of the radicals R and R' represents an unsaturated hydrocarbon radical such as vinyl, 2-propenyl, 2-butenyl, 3-butenyl, pentenyl and hexenyl as well as alkyl-substituted derivatives thereof such as methallyl, ethallyl, methylcrotyl, methylpentenyl and the like. The other member of the group R and R' can be a lower alkyl radical such as methyl, ethyl, straight and branch chained propyl, butyl, amyl and hexyl, an aralkyl radical such as benzyl, phenethyl and phenylpropyl and an aryl radical such as phenyl, tolyl and the like. The lower alkyl radical in the 5-position can be methyl, ethyl, straight or branch chained propyl, butyl, amyl and hexyl.

In my copending application, Serial No. 260,339, filed December 6, 1951, and in my joint application with Elmer F. Schroeder, Serial No. 264,248, filed December 29, 1951, there were described certain 1,3-disubstituted alkenylalkyl derivatives of 6- amino - 1,2,3,4-tetrahydro-2,4-pyrimidinedione and the corresponding 2-thio derivatives in which the carbon atom in the 5-position was attached to a hydrogen atom. I have now found that substitution at that position of a lower alkyl radical leads to useful compounds with a diuretic potency which is at least comparable to that produced by the compounds described and disclosed in these previous applications.

The preferred method for obtaining most of the compounds of this invention consists in the reaction of a urea derivative of the type

R—NH—CX—NHR' with an α-cyanoalkanoic acid of the type (lower alkyl)—CH(CN)—COOH to form a mixture of the compounds of the type

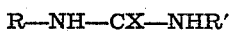
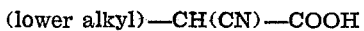
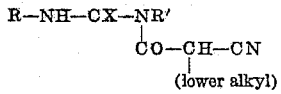

and

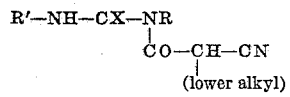

all symbols being defined as hereinabove.

The compounds in which X is oxygen are the subject matter of a copending joint application of applicant and Elmer F. Schroeder, Serial No. 254,196, filed October 31, 1951. These cyanoalkanoyl radicals are then cyclized by treatment with alkali for a few minutes at a moderate temperature, preferably about 65–75° C. in the case of the 2-oxo derivatives, 50–55° C. in the case of the 2-thio derivatives. It will appear that if R and R' are not identical, a mixture of isomers is obtained.

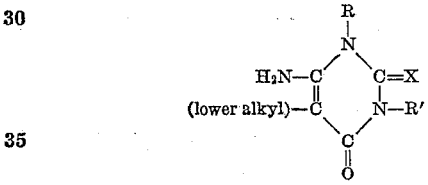

and

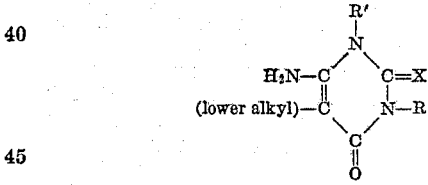

This mixture can be separated by fractional crystallization. However, since both isomers have usually shown a comparable degree of therapeutic activity, and since this fractional crystallization is sometimes quite laborious, medicinal use of the unseparated mixture of both isomers is usually preferred. It has been found that in the mixture produced by this process the predominating isomer will be the one in which the radical in the 1-position is larger than the one in the 3-position.

Where it is necessary to prepare the pure 1-alkenyl-3-alkyl isomer it is preferable to treat the alkenylurea or alkenylthiourea with the α-cyanoalkanoic acid, cyclize the resulting N-alkenyl-N'-cyanoacetylurea or thiourea to form the alkenyl-substituted pyrimidinedione, unsubstituted in the 3-position, and treat the latter with an alkylating agent such as an alkyl halide or an alkyl sulfate.

The pure 1-alkyl-3-alkenyl isomer can be prepared by reacting an N-alkenyl α-cyanoalkanamide with an alkyl isocyanate and ring closure of the resulting N-cyanoalkanoyl-N-alkenyl-N'-alkylurea. However this procedure is not very advantageous from the standpoint of yield.

The examples below illustrate further certain of the experimental procedures used. However the invention is not to be construed as limited thereby in spirit or in scope. In these examples temperatures are indicated in degrees centigrade (°C.), pressures in millimeters of mercury (mm.) and quantities in parts by weight.

EXAMPLE 1

*1 - allyl - 2 - thio - 5 - methyl - 6 - amino - 1,2,3,4-tetrahydro-2,4-pyrimidinedione*

A solution of 75 parts of metallic sodium and 2400 parts of absolute ethanol is treated with 500 parts of allylthiourea. The mixture is heated at reflux temperature and 500 parts of the methyl ester of α-cyanopropionic acid is added gradually. After heating at reflux temperature for 4 hours this solution is concentrated to a syrup by vacuum distillation, diluted with an equal volume of water and treated with 10% hydrochloric acid to lower the pH to 4. After cooling the precipitate is collected on a filter and recrystallized from 6500 parts of ethanol with charcoal decolorization. The resulting 1-allyl-2-thio-5-methyl-6-amino - 1,2,3,4, - tetrahydro-2,4-pyrimidinedione melts at about 233–234° C. It has the structural formula

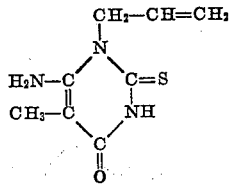

EXAMPLE 2

*1 - allyl - 5 - ethyl - 6 - amino - 1,2,3,4 - tetrahydro-2,4-pyrimidinedione*

A solution of 30 parts of allylurea in 110 parts of acetic anhydride is heated for 2 hours at 55–60° C. with 45 parts of a α-cyanobutyric acid and then concentrated in a vacuum at a temperature not exceeding 60° C. to a syrup. 100 parts of water are added and vacuum distillation is resumed whereupon a precipitate is obtained which is collected on a filter and recrystallized from about 1100 parts of water. The N-(α-cyanobutyryl)-N'-allylurea is obtained, melting at about 102–103° C. These crystals are treated with a sufficient amount of 25% sodium hydroxide solution to bring the pH to 10 and heated at 60° C. for 10 minutes. After cooling the mixture is rendered weakly acid by the addition of dilute hydrochloric acid and the resulting precipitate is collected on a filter. The cubic crystals are recrystallized from 1000 parts of water and are thus obtained in the form of shining plates melting at about 270–271° C. The 1-allyl-5-ethyl - 6 - amino - 1,2,3,4 - tetrahydro - 2,4-pyrimidinedione has the structural formula

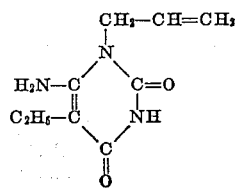

EXAMPLE 3

*1-allyl-2-thio-5-isopropyl-6-amino-1,2,3,4-tetrahydro-2,4-pyrimidinedione*

A solution of 30 parts of allythiourea in 110 parts of glacial acetic acid is heated for 45 minutes at 50° C. with 45 parts of α-cyanoisopentanoic acid. After vacuum distillation at 10 mm. pressure of the product to a syrup, dilution with 200 parts of water and continued vacuum distillation to a thick syrup, the product is permitted to stand at room temperature for several weeks whereupon there is some tendency to crystallize. The crystalline N-(α-cyanoisopentanoyl)-N'-allyl-thiourea is collected on a filter. The crystals are treated with a sufficient amount of 10% sodium hydroxide to raise the pH to 10 at about 50° C. and, after standing for 10 minutes, the solution is rendered weakly acid by the addition of 10% hydrogen chloride. The resulting crystals contain 1 - allyl - 2 - thio - 5 - isopropyl-6 - amino-1,2,3,4-tetrahydro-2,4-pyrimidinedione which recrystallized from 50% ethanol melts at about 217–220° C. The product has the structural formula

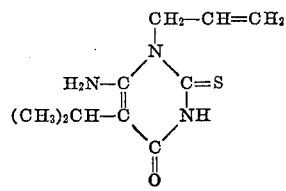

EXAMPLE 4

*1 - allyl - 3,5 - diethyl - 6 - amino - 1,2,3,4 - tetrahydro-2,4-pyrimidinedione and 3-allyl-1,5-diethyl - 6 - amino - 1,2,3,4 - tetrahydro - 2,4-pyrimidinedione*

A solution of 150 parts of N-ethyl-N'-allylurea in 330 parts of acetic anhydride is treated with 150 parts of α-cyanobutyric acid and heated at 55° C. for 2 hours. The solution is then concentrated in vacuo at about 50° C. to a syrup as far as practical after which 100 parts of water are added and the vacuum distillation is repeated The remaining syrup contains a mixture of N-(α-cyanobutyryl)-N-ethyl-N'-allylurea and a somewhat smaller quantity of N-(α-cyanobutyryl)-N-allyl-N'-ethylurea.

This syrup is treated with a sufficient amount of 10% sodium hydroxide solution to raise the pH to 10. After heating at 75° C. for 10 minutes the mixture is cooled and the precipitate collected on a filter. Recrystallized from 2500 parts of water using charcoal decolorization, the mixture of 1-allyl-3,5-diethyl-6-amino-1,2,3,4- tetrahydro-2,4-pyrimidinedione and a smaller amount of 3-allyl-1,5-diethyl-6-amino-1,2,3,4-tetrahydro-2,4-pyrimidinedione is thus obtained in the form of monohydrated crystals which melt at about 114–116° C. From the mother liquid some anhydrous crystals are obtained melting at about 143–145° C. The two isomers have the structural formulae

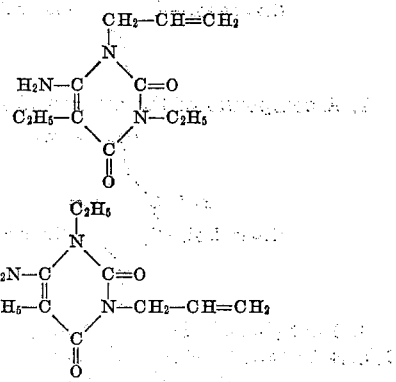

EXAMPLE 5

1 - methallyl - 3 - ethyl - 5 - isopropyl - 6 - amino-1,2,3,4 - tetrahydro - 2,4 - pyrimidinedione and 1 - ethyl - 3 - methallyl - 5 - isopropyl - 6 - amino-1,2,3,4-tetrahydro-2,4-pyrimidinedione 200 parts of methallylethylurea are dissolved in 440 parts of acetic anhydride and then treated with 200 parts of α-cyanoisopentanoic acid. The reaction mixture is heated at 60° C. for 135 minutes after which it is vacuum distilled at about 50° C., diluted with water and again concentrated to a syrup. The resulting mixture of N - (α - cyanoisopentanoyl)-N-ethyl-N'-methallylurea and N - (α - cyanoisopentanoyl)-N-methallyl-N'-ethylurea, in which the former compound predominates, is treated with 20% sodium hydroxide to raise the pH above 7 while the temperature is controlled at about 75° C. Upon chilling a crystalline cake is obtained which softens at room temperature. The crystalline cake is collected on a filter and suspended in a small quantity of absolute ether, collected on a filter and washed rapidly with small quantities of ether. Upon recrystallization from absolute ether, beautiful glittering crystals are obtained which melt at about 163–165° C. The product consists of a mixture containing mainly 1-methallyl - 3 - ethyl - 5 - isopropyl - 6 - amino - 1,2,3,4-tetrahydro-2,4-pyrimidinedione and some 1-ethyl - 3 - methallyl - 5 - isopropyl - 6 - amino-1,2,3,4 - tetrahydro-2,4-pyrimidinedione. These compounds have the structural formula

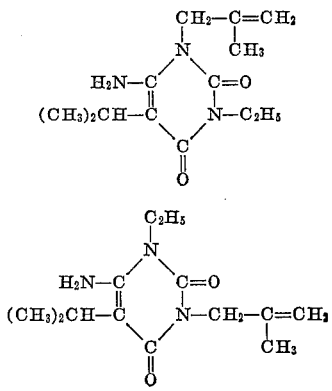

EXAMPLE 6

1 - isobutyl - 3 - allyl - 5 - methyl - 6 - amino-1,2,3,4 - tetrahydro - 2,4 - pyrimidinedione and 1 - allyl - 3 - isobutyl - 5 - methyl - 6 - amino-1,2,3,4-tetrahydro-2,4-pyrimidinedione A solution of 38 parts of N-allyl-N'-isobutylurea in 110 parts of acetic anhydride is treated with 27 parts of α-cyanopropionic acid and the temperature is maintained at 60° C. for 2 hours. The solvent is removed as completely as practicable at 20 mm. pressure after which 200 parts of water are added and the solution is redistilled in vacuo until a syrup remains which contains a mixture of N-(α-cyanopropionyl)-N-allyl-N'-isobutylurea and the N-(α-cyanopropionyl)-N-isobutyl-N'-allylurea.

This syrup is dissolved in an equal volume of a 10% sodium hydroxide solution and the pH is raised to 10 by addition of 70% sodium hydroxide. The mixture is maintained at 75° C. for 5 minutes, then cooled to yield 1-isobutyl-3-allyl-5-methyl-6 - amino - 1,2,3,4 - tetrahydro-2,4-pyrimidinedione and a smaller amount of 1-allyl-3-isobutyl - 5 - methyl - 6-amino-1,2,3,4-tetrahydro-2,4-pyrimidinedone. White rhomboid crystals are obtained which contain water of crystallization. The products have the structural formulae

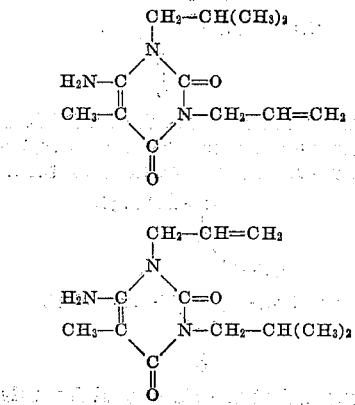

EXAMPLE 7

1 - phenethyl - 2 - thio - 5 - methyl - 6 - amino-1,2,3,4-tetrahydro-2,4-pyrimidinedione To a solution of 68 parts of β-phenethylamine in 140 parts of toluene, 61 parts of allyl isothiocyanate are slowly added with agitation and while the temperature is maintained at 25° C. the solvent is removed by vacuum distillation. A solution of 192 parts of the N-allyl-N'-phenethylthiourea thus obtained in 200 parts of acetic anhydride is reacted with 125 parts of α-cyanopropionic acid at 60° C. for 2 hours. Vacuum distillation yields a syrup consisting principally of N - (α - cyanopropionyl-ethyl-N'-phenethylthiourea and containing only a minor quantity of N-phenethyl-N-(α-cyanopropionyl)-N'-allylthiourea. This mixture of thioureas is cyclized by raising the pH to 10 and heating at 70° C. for 5 minutes. After chilling, the precipitate is recrystallized repeatedly from 50% ethanol. By such repeated recrystallizations, one obtains most exclusively the 1 - phenethyl - 2-thio-3-allyl-5-methyl - 6 - amino - 1,2,3,4 - tetrahydro - 2,4- pyrimidinedione in solvated white prisms, which has the structural formula

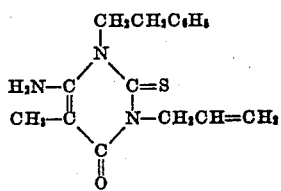

I claim:
1. The compounds of the structural formula

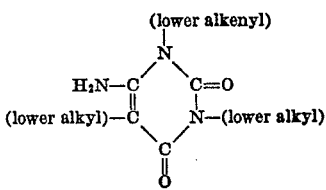

wherein X is a member of the class consisting of oxygen and sulfur, one of the radicals R and R' represents a lower alkenyl radical and the other a member of the class consisting of lower alkyl, lower phenylalkyl, phenyl radicals and, in the case of R' only, hydrogen radicals.

2. The compounds of the structural formula

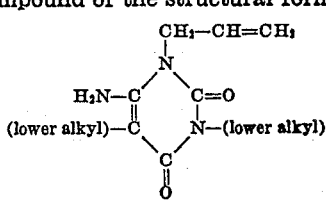

wherein one of the radicals R and R' is a lower alkenyl radical and the other a lower alkyl radical.

3. A compound of the structural formula (lower alkenyl)

$H_2N-C\quad C=O$
(lower alkyl)—C  N—(lower alkyl)
C
‖
O

4. A compound of the structural formula $CH_2-CH=CH_2$ $H_2N-C\quad C=O$
(lower alkyl)—C  N—(lower alkyl)
C
‖
O 5. 1-allyl-3,5-diethyl - 6 - amino-1,2,3,4-tetrahydro-2,4-pyrimidinedione.

6. A compound of the structural formula

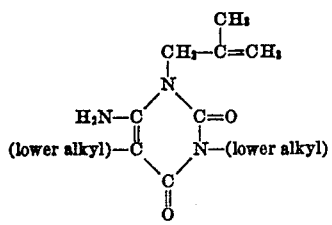

7. A compound of the structural formula

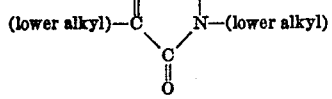

8. 1-ethyl-3-allyl-5-(lower alkyl) - 6 - amino-1,2,3,4-tetrahydro-2,4-pyrimidinediones.

9. A compound of the structural formula

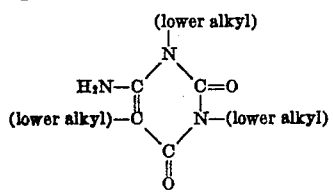

10. 1-allyl-5-(lower alkyl) - 6 - amino - 1,2,3,4-tetrahydro-2,4-pyrimidinediones.

11. A compound of the structural formula

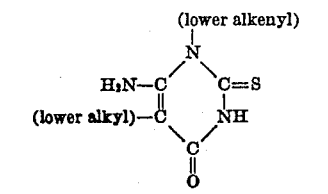

12. 1-allyl-2-thio-5-(lower alkyl) - 6 - amino-1,2,3,4-tetrahydro-2,4-pyrimidinediones.

VIKTOR PAPESCH.

No references cited.